SEARCH ROOM
T6532

March 3, 1964 L. B. JOHNSTON 3,123,667

COLOR KINESCOPE DISPLAY SYSTEM

Filed Dec. 15, 1961 2 Sheets-Sheet 1

INVENTOR.
LOREN B. JOHNSTON
BY
W. A. Sprague
Attorney

INVENTOR.
LOREN B. JOHNSTON
BY
Attorney 3,123,667
Patented Mar. 3, 1964

3,123,667

COLOR KINESCOPE DISPLAY SYSTEM

Loren B. Johnston, Princeton, N.J., assignor to Radio Corporation of America, a corporation of Delaware Filed Dec. 15, 1961, Ser. No. 159,538
5 Claims. (Cl. 178—5.4)

This invention relates generally to color kinescope display systems and more particularly to display systems of the so-called indexing type wherein the color image reproduction process utilizes an indexing signal generated in response to scanning of the display screen.

In a well known form of indexing type color kinescope display arrangement, the color kinescope is provided with a screen having a vertical strip or line pattern of different color emitting phosphors, i.e., red, green and blue light emitting phosphor strips arranged transversely with respect to the raster scanning lines and repeating in a fixed sequence across the face of the tube. The screen structure also includes a repeating pattern of vertical indexing strips. In one contemplated form of vertical line screen kinescope, the indexing pattern comprises strip-like areas of phosphor capable of emitting ultra-violet (UV) light in response to excitation by the kinescope beam. While various repetition rates for the location of the indexing strip are useable, one advantageous arrangement employs one indexing strip for each color sequence; that is, a UV strip is associated with each triplet of color emitting phosphor strips. The indexing frequency developed in a UV responsive device when an indexing pattern of this type is scanned may be referred to as the fundamental frequency since it is the same frequency at which the successive strips of any given color are traversed.

The fundamental frequency indexing signal developed in the manner described above serves as a suitable carrier wave for modulation by a recovered color signal. It has been proposed to use the resultant modulated carrier wave in combination with a recovered luminance signal to intensity modulate the scanning beam of the color kinescope in order to develop the desired color image on the vertical line screen. It has alternatively been proposed to use the resultant modulated carrier wave to modulate the line scanning velocity of the color kinescope beam (effecting cyclic "spot arresting" of the kinescope beam), such scanning velocity modulation being accompanied by intensity modulation of the beam in accordance with the luminance signal, whereby to develop the desired color image on the vertical line screen.

In systems where color image reproduction is sought to be achieved in accordance with the intensity modulation scheme as described above, a problem is encountered due to the effect of hue changes of the displayed information on the phase of the generated indexing signal. This adverse effect, sometimes referred to as "color pulling," tends to introduce hue errors in the reproduced image. The "color pulling" problem is also encountered in reproduction schemes of the scanning velocity modulation type described above. However, as disclosed in the co-pending application of Eugene Keizer, Serial No. 129,807, filed on August 7, 1961, and entitled "Color Television," for at least certain colors to be reproduced, the color pulling errors encountered due to intensity modulation are opposite in effect to the color pulling errors encountered due to scanning velocity modulation. The aforementioned co-pending Keizer application discloses a color image reproduction system in which both intensity and scanning velocity modulation techniques are employed, the respective modulation operations being interrelated in such a manner as to alleviate adverse color pulling effects by matching to the extent possible the opposing color pulling errors.

The present invention is directed to an improvement on the matched modulation system of the above-mentioned Keizer application. It has been observed that the color pulling errors encountered in response to scanning velocity modulation in accordance with a modulated fundamental frequency indexing signal cyclically vary with hue to be reproduced at a rate corresponding to twice the fundamental frequency. It has further been observed that such double cycle variations in color pulling error can be substantially matched in a cancelling manner by use of second harmonic intensity modulation, i.e., by use of the second harmonic of the fundamental frequency indexing signal in the intensity modulation operation of the matched modulation system generally disclosed in the Keizer application.

In accordance with an embodiment of the present invention, a fundamental frequency indexing signal derived from the scanning of a vertical line screen is modulated in accordance with recovered chrominance information and applied to a spot arresting coil adapted to cause line scanning velocity modulation of the color kinescope beam. The modulated indexing signal is also applied to frequency doubling apparatus to develop a modulated second harmonic indexing signal, which is applied to a beam intensity control electrode of the color kinescope. Recovered luminance signals are also applied to a beam intensity control electrode of the color kinescope. Color images are reproduced by this arrangement with a significant reduction of adverse color pulling effects.

An object of the present invention is to provide a color image reproducing system employing an indexing type color kinescope in a novel manner tending to minimize color distortion.

Other objects and advantages of the present invention will be readily apparent to those skilled in the art upon a reading of the following detailed description and an inspection of the accompanying drawings in which.

Figures 1, 1A, 2:
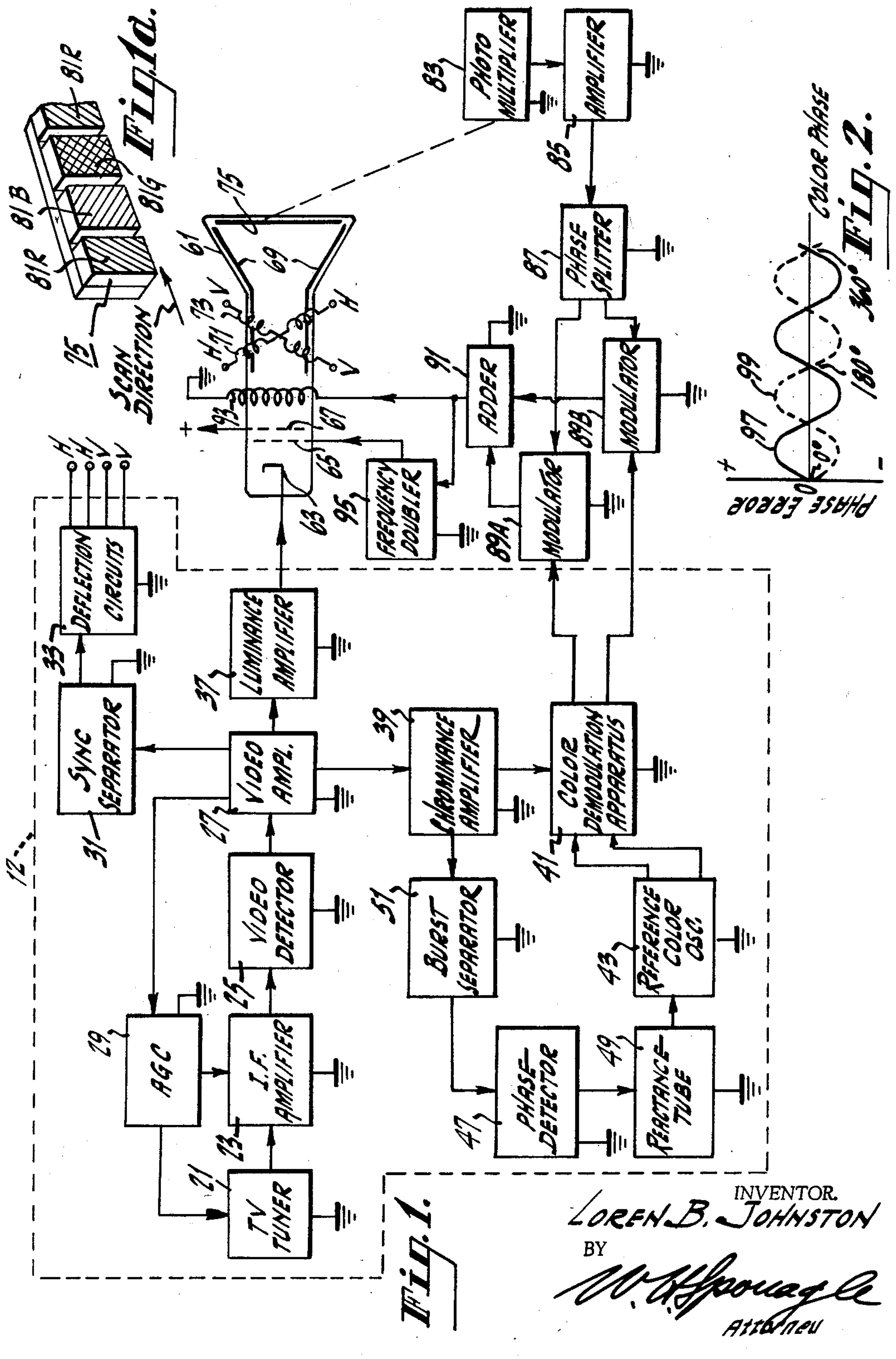
FIGURE 1 illustrates in block and schematic form a color television receiver employing a color kinescope of the indexing type in an arrangement utilizing an embodiment of the present invention.
FIGURE 1A illustrates the structure of the kinescope screen employed in the receiver of FIGURE 1.
FIGURE 2 illustrates graphically certain color error characteristics associated with elements of the system of FIGURE 1.

The color television receiver of FIGURE 1 includes a number of well known components which are employed in current television receivers of the type using a shadow mask kinescope display. These receiver portions, generally designated by the reference numeral 12, may, for example, be similar in structure and function to the corresponding elements of the RCA CTC–11 color television chassis described in the RCA Service Data Pamphlet designated 1960 No. T9. The apparatus 12 includes a television tuner 21, which responds to the reception of broadcast television signals to produce intermediate frequency signals, bearing composite television signal modulation, which signals are supplied to the intermediate frequency (IF) amplifier 23. The IF amplifier 23 output is supplied to a video detector 25, which demodulates the modulated IF carrier to recover a composite video signal. A separate detector (not illustrated) may be conventionally provided to also respond to the IF amplifier 23 output to provide, in accordance with well known intercarrier sound techniques, a sound IF signal for driving the receiver's sound channel (also not illustrated).

The output of the video detector 25 is supplied to a video amplifier 27 which amplifies the detected composite video signal and supplies the amplified signals to a number of the operating circuits of the receiver. One of the outputs of the video amplifier 27 is supplied to automatic gain control apparatus 29, which may be of the well known keyed AGC variety, responding to variations in the amplitude of the deflection synchronizing pulses of the detected composite signal to produce a control potential which is used to control the gain of amplifying stages in the tuner 21 and IF amplifier 23 in a direction compensating for such variations. Another output of the video amplifier 27 is applied to a sync separator 31 which separates respective horizontal and vertical deflection synchronizing pulses from the detected composite signal, the separated pulses being supplied to deflection circuits 33 to suitably synchronize the generation of the deflection waves used to develop a scanning raster on the screen of the color kinescope (to be subsequently described).

Another output of video amplifier 27 is supplied to a luminance amplifier 37, which serves to amplify the luminance component of the composite signal for application to the color kinescope. A further output of the video amplifier 27 is applied to a chrominance amplifier 39, which has a band pass characteristic for selectively amplifying the chrominance component of the detected amplified signal, the chrominance component comprising the color subcarrier and its side bands. The chrominance amplifier 39 output is applied to color demodulation apparatus 41 for synchronous demodulation of the subcarrier to produce color difference signal outputs. To effect the desired synchronous demodulation, a local source of unmodulated subcarrier frequently waves of a reference phase is required. Such a source is constituted by a reference color oscillator 43, which nominally operates at the color subcarrier frequency, and which is controlled in frequency and phase by automatic frequency and phase control apparatus, comprising a phase detector 47 comparing the oscillator 43 output with received color synchronizing bursts to derive control information for adjusting a reactance tube 49 associated with the frequency determining circuits of the oscillator 43.

The color synchronizing burst input to the phase detector 47 is supplied from a burst detector 51, which comprises a gate circuit coupled to the output of chrominance amplifier 39 and controlled by suitably timed gating pulses (derived from the deflection circuits 33 in a conventional manner) to pass signals only during the recurring time intervals occupied by the color synchronizing bursts.

The color demodulation apparatus 41 may include, in addition to the previously mentioned synchronous demodulators, suitable matrixing circuits for combining the demodulator outputs, where the color difference signals desired for subsequent untilization differ from those directly provided by the demodulators.

It will be seen from the foregoing that the structure 12 provides as outputs for use in the display portion of the receiver: (*a*) luminance information appearing at the output of luminance amplifier 37 and (*b*) chrominance information appearing in the form of color difference signals at the outputs of the color demodulation apparatus 41. Additionally, of course, the structure 12 provides suitable deflection circuits 33 for effecting the display scanning.

The display portion of the receiver employs a color kinescope 61 of the single-gun, vertical line screen type. The color kinescope 61 includes the usual electron gun electrodes, including a cathode 63, a control grid 65 and a first anode 67. The kinescope 61 also includes the usual final accelerating or ultor electrode 69, in the conventional form of a conductive coating on the inner surface of the kinescope bulb. The kinescope 61 also includes suitable beam focusing structure (not shown) for insuring the development of a properly focused scanning beam. Associated with the color kinescope 61 is a deflection yoke including horizontal and vertical coils, 71 and 73, respectively. The respective deflection coils are energized with the scanning wave outputs of deflection circuits 33 to cause the kinescope beam to develop a scanning raster on the screen 75.

The luminance signal output of luminance amplifier 37 is applied, illustratively, to the cathode 63 of the color kinescope 61 to thus control the elemental brightness of the display on the screen 75 in a familiar manner.

The structure of screen 75 comprises a pattern of vertically disposed phosphor strips of different color emission characteristics, recurring in a regular sequence. A representative sequence is illustrated in the detailed showing of FIGURE 1A, in which red emitting phosphor strips are designated by the reference numeral 81R, blue emitting phosphor strips are designated by the reference numeral 81B, and green emitting phosphor strips are designated by the reference numeral 81G. The screen 75 also incorporates a pattern of indexing strips. While a variety of indexing elements and patterns thereof are known to the art, for the purpose of simplicity in the description of the present invention, it will be assumed that the indexing elements comprise phosphor elements emissive of ultra violet light, and it will be further assumed that these ultra violet emissive phosphor elements are mixed with the blue emitting phosphor elements. Thus, the reference numeral 81B designates not only the blue emitting phosphor strips but alse the indexing strips. Thus, also, the indexing pattern employed on the screen 75 is one in which there is provided an indexing strip for each sequence of three different color emitting phosphor strips.

A light responsive device selectively responsive to ultra violet light is provided to respond to the successive beam impingement on indexing strips 81B as the kinescope beam scans across the vertical line screen. In the receiver system of FIGURE 1, photomultiplier 83 serves as such an ultra violet responsive device. A train of impulses, corresponding in time to the occurrences of the successive beam impingements on the indexing strips 81B, appears in the output of photomultiplier 83. These impulses are supplied to an amplifier 85, which includes a clipping stage, serving to substantially eliminate amplitude variations of the successive impulses. The amplifier 85 also preferably includes an additional amplifying stage nominally tuned to the fundamental indexing frequency. The output of amplifier 85 is accordingly a substantially sinusoidal, substantially constant amplitude wave of a fundamental indexing frequency. A phase splitter 87 receives the indexing wave output of amplifier 85, and supplies selectively different phases of this indexing wave to modulators 89A and 89B. In each of the modulators, the supplied indexing wave is subjected to amplitude modulation in accordance with a selected one of the color difference signal outputs of the color demodulation apparatus 41.

The output of modulators 89A and 89B are combined in adder 91 to effectively form a new phase and amplitude modulated color subcarrier, where the subcarrier frequency corresponds to the fundamental indexing frequency, and accordingly corresponds to the frequency at which successive strips of any given color emission are traversed by the scanning beam. The output of adder 91 is utilized to energize a spot arresting coil 93 associated with the color kinescope 61. The resultant horizontal scanning velocity modulation of the kinescope beam causes development of a color image on the kinescope screen in accordance with the color information represented by the subcarrier modulation.

The output of adder 91 is also applied to frequency doubler apparatus 95, the output of which comprises a phase and amplitude modulated subcarrier, where the subcarrier frequency corresponds to the second harmonic of the fundamental indexing frequency. This frequency doubler output is applied to the control grid 65 of the color kinescope 61, whereby intensity modulation of the kinescope beam is effected therewith. Such intensity modulation supplements the aforementioned scanning velocity modulation in development of the desired color image on the kinescope screen.

For a thorough explanation of the manner in which respective intensity modulation and line scanning velocity modulation techniques generally effect the desired coloring of the reproduced image, reference may be made to the aforementioned copending Keizer application. Briefly, however, by way of example, it may be noted that in reproduction of a bright, relatively highly saturated blue portion of the image the modulation of the indexing wave is such as to result in (*a*) a cyclic variation in the intensity of the kinescope beam so phased as to produce high intensity periods which coincide with beam impingement on the successive blue-emitting phosphor strips, and (*b*) a cyclic variation in the speed of beam traversal of the phosphor strips so phased as to produce relatively slow traversals of successive blue-emitting phosphor strips in contrast with rapid traversals of the intervening red-emitting and green-emitting phosphor strips. A shift in image hue to red, for example, desirably results in (*a*) a shift in the phase of the cyclic variation in beam intensity so that high intensity periods are produced which coincide with beam impingement on successive red-emitting phosphor strips, and (*b*) a shift in the phase of the cyclic variation in line scan speed so that the beam dwells on the successive red-emitting phosphor strips in contrast with rapid traversals of the intervening green-emitting and blue-emitting phosphor strips.

The aforementioned copending Keizer application also presents a detailed explanation of the origin of the so-called color pulling errors which accompany each of the intensity and scan modulation operations referred to above and which interfere with achievement of the desired phasing of the respective cyclic variations. Such a detailed explanation need not be repeated here, since the present invention may be understood without it. For present purposes, it should suffice to note that, when the hue of the image to be reproduced is different from that hue which is reproduced when the beam is centered on an indexing element, spurious phase shifts are introduced into the indexing signal generated in response to target scanning.

To appreciate the advantages of the use of the second harmonic of the fundamental indexing frequency in the intensity modulation portion of the herein described matched modulation system, reference should now be made to the characteristics illustrated graphically in FIGURE 2. The curve 97 shown in solid line form is representative of the hue errors encountered in the reproducing system when the fundamental frequency spot arresting technique alone is used to effect color reproduction. The abscissa of the FIGURE 2 graph represents hue to be reproduced, designated in terms of subcarrier phase. The 0° and 360° points on the abscissa correspond, for the illustrated system, with blue, the hue reproduced when the beam is centered on an indexing element. The ordinate of the FIGURE 2 graph represents hue error, which may be designated in terms of indexing signal phase error. Errors above the zero reference line, and arbitrarily designated plus (+), represent undesired phase shifts of the indexing signal in one (e.g. leading) direction, while errors below the zero reference level and designated minus (−), represent undesired phase shifts of the indexing signal in the opposite (lagging) direction. The hue error, or "color pulling," curve 97 is characterized by four crossings of the zero axis in 360° of color phase, i.e., in a sweep of the full spectrum of reproducible colors.

Dotted line curve 99 represents the hue errors encountered in the reproducing system when using second harmonic intensity modulation alone to effect color image reproduction. Curve 99 is also characterized by four axis crossings in 360° of color phase, but each axis crossing is of opposite slope to the corresponding axis crossing of the curve 97.

It may thus be observed from a study of the respective color pulling curves in FIGURE 2 that the hue error encountered with second harmonic intensity modulation varies with hue to be reproduced at the same rate as the hue errors encountered with fundamental spot arresting, but in an anti-phasal relationship therewith. Each positive lobe of the spot arresting color pulling curve 97 is matched by a negative lobe of the second harmonic intensity modulation color pulling curve 99, and, likewise, each negative lobe of curve 97 is matched by a positive lobe of curve 99. Accordingly, the hue errors introduced by spot arresting will tend to be cancelled out by the hue errors introduced by second harmonic intensity modulation.

It should be noted that the curves of FIGURE 2 are idealized curves, showing symmetry of positive and negative color pulling for each modulation technique, and showing a perfect match of axis crossings and lobe amplitudes between the respective curves, which are conditions not necessarily encountered in practice. The exact character of the respective color pulling curves will depend on a number of factors, such as indexing strip width relative to width of color triplet, spot size, degree of spot arrest, degree of intensity modulation, etc. A set of particular choices of these variables may result, for example, in a spot arresting pulling curve having positive lobes of greater amplitude and longer duration than the negative lobes thereof. It may be difficult to exactly complement such a color pulling curve with an intensity modulation color pulling curve with exactly opposing asymmetry. Also, in practice, it may not be possible to exactly match the points of axis crossing of the intensity modulation color pulling curve with the points of axis crossing of the spot arresting color pulling curve. Nevertheless, the exact matching conditions illustrated in FIGURE 2 may be approximately to a sufficient degree by suitable choice of such variables as the relative degrees of intensity modulation and spot arresting, as to significantly lessen the color pulling problem.

Figure 3:
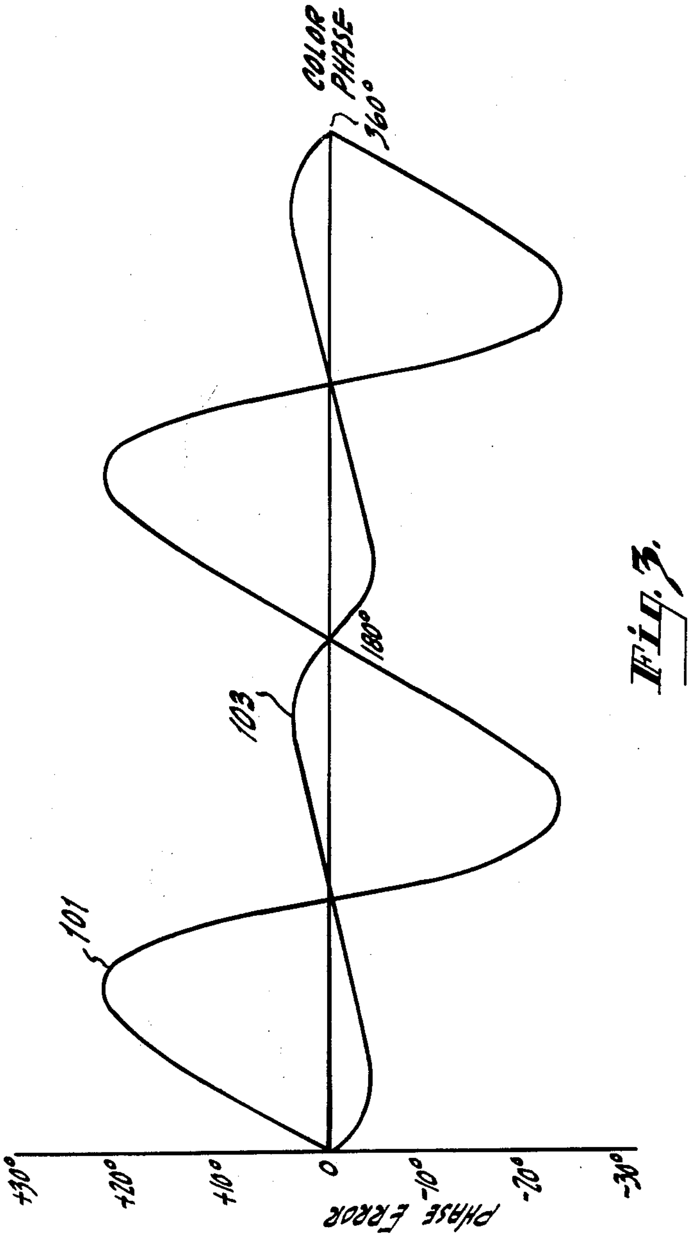

FIGURE 3 is illustrative of the significant lessening of the color pulling problem attainable with a particular set of values for the various pertinent parameters noted above. The following conditions prevail for the example of FIGURE 3:

Each of the successive triplets of different color emitting phosphor strips is provided with an associated UV strip, and the width of each UV strip is equal to one-half of the color group pitch (i.e. one-half of the width of each triplet). The spot size of the color kinescope beam is equal to five-twelfths of the color group pitch, with the energy distribution of the beam following a $\cos^2 \theta$ function.

Curve 101 in FIGURE 3 is a representative of the hue errors encountered in the reproducing system, under the above specified conditions, with use of the fundamental frequency spot arresting technique alone to effect color reproduction, the degree of spot arresting employed being 132%. Curve 103 in FIGURE 3 is representative of the significantly reduced hue errors encountered in the reproducing system, under said specific conditions, when the 132% spot arresting procedure is employed conjointly with the previously discussed second harmonic intensity modulation procedure the degree of second harmonic intensity modulation being 40%.

In explanation of the percent designations above, it should be noted:

(*a*) 132% spot arresting is recited with reference, in the usual mathematical sense, to a condition expressed as 100% spot arresting, which is of the following nature: the maximum peak-to-peak value of the indexing wave applied to the spot arresting coil (applied when seeking to reproduce a color with maximum saturation) is such that, at the peak of each half cycle of the polarity which produces flux tending to oppose normal line scanning deflection, the spot arresting flux is sufficient to just momentarily stop the beam's motion. Accordingly, it may be appreciated that where 100% spot arresting is exceeded, the beam's motion is not only periodically stopped, but also caused to reverse direction for some limited extent of time.

(*b*) 40% second harmonic intensity modulation is recited with reference, in the usual mathematical sense, to a condition expressed as 100% second harmonic intensity modulation which is of the following nature: the maximum peak-to-peak value of the indexing wave second harmonic applied to the beam intensity control electrode (applied when seeking to reproduce a color with maximum saturation) is of such a magnitude and so related to operating biases that, at the peak of each half cycle of the polarity which lessens beam intensity, cutoff of the beam is just reached (with an absence of deviations from operating biases due to luminance signal application being assumed).

The curves 101 and 103 of FIGURE 3 illustrate an example where application of the principles of the present invention provides a reduction in phase error due to color pulling from a range of approximately ±22° to a tolerable range of ±4°. It should be noted that this color pulling reduction is accomplished by an increase in the maximum attainable saturation in reproduction of the respective colors; it is important that arrangements for effecting color pulling reduction do not achieve this goal at the expense of reducing the maximum attainable saturation.

In the conditions assumed for the example of FIGURE 3, the width of each UV strip was recited as equal to one-half of the color group pitch. If color strips of symmetrical widths, as shown in FIG. 1A, are to be employed, a UV strip of the noted one-half relation cannot be provided simply by mixing the UV emitting phosphor with the phosphor of a particular color strip. A separate UV strip structure, overlaying the color strip structure, as explained in more detail, for example, in the aforementioned copending Keizer application, may be employed to obtain the desired one-half relationship. It also may be noted that certain phosphor sets, considered to be particularly useful for strip-target type color reproducers, call for target structures where the respective color strip widths are not symmetrical; thus, where asymmetrical color strip widths are employed, and the width of a particular color strip approximates one-half of the color group pitch, the UV-color phosphor mixing tech- color group pitch, the UV-color phosphor mixing technique may still be employed to obtain a UV strip width of the one-half relationship desired for the example of FIGURE 3.

What is claimed is:

1. In a system for displaying color images in response to correlated luminance and chrominance information comprising a color image reproducing device having means for generating a beam of electrons, means for controlling the intensity of said beam of electrons, and a target for said beam of electrons, said beam target comprising an array of phosphor strips of different color emission characteristics arranged in a repeating sequence and including a plurality of indexing elements in association with said phosphor strips; apparatus comprising the combination of beam deflection means for causing said beam of electrons to trace a succession of substantially parallel scanning lines on said target transversely with respect to the phosphor strips of said array, the tracing of said scanning lines causing successive beam traversals of said indexing elements; means responsive to the beam traversals of said indexing elements for developing an indexing wave of a fundamental frequency nominally equal to the frequency at which successive phosphor strips of a given one of said different color emission characteristics are traversed by said beam; means coupled to said fundamental frequency indexing wave developing means for developing a second indexing wave of a frequency substantially equal to the second harmonic of said fundamental frequency; means for varying the velocity at which said beam traces said scanning lines; means coupled to said beam intensity controlling means for utilizing the second harmonic indexing wave developed by said second-named developing means to modulate the intensity of said electron beam; and means coupled to said line scanning velocity varying means for utilizing the fundamental frequency indexing wave developed by said first-named developing means to modulate the line scanning velocity of said electron beam; said apparatus also including means rendering both of said indexing wave utilizing means response to said chrominance information in such manner that each of the respective indexing waves utilized for beam modulation therein is modulated in accordance with chrominance information.

2. In a color television receiver employing a vertical line screen color kinescope having a multi-phosphor strip target incorporating indexing structure from which an indexing wave may be derived in response to the tracing of scanning lines on said target by the kinescope electron beam, said receiver also including a source of luminance signals and a source of chrominance signals, the combination comprising, means coupled to said chrominance signal source and responsive to said derived indexing wave for modulating said indexing wave with said chrominance signals, frequency doubling means, means for applying the output of said indexing wave modulating means to said frequency doubling means, means coupled to said luminance signal source for varying the intensity of said kinescope beam in accordance with said luminance signals, means coupled to said frequency doubling means for additionally varying the intensity of said kinescope beam in accordance with the output of said frequency doubling means, and means coupled to said indexing wave modulating means for varying the line scanning velocity of said kinescope beam in accordance with the output of said indexing wave modulating means.

3. In a color television receiver including a color kinescope having a display screen comprising a plurality of phosphor strips capable of emitting light of different colors when subject to impingement by an electron beam, said different color emitting phosphor strips being arranged in a regularly recurring pattern, and a plurality of indexing strips associated with said phosphor strips and capable of producing indexing information when subject to impingement by an electron beam, said color kinescope also including a source of a beam of electrons and means for controlling the intensity of said beam; apparatus comprising the combination of: deflection means associated with said color kinescope for causing said beam to trace a scanning raster on said screen, said scanning raster comprising a succession of substantially parallel scanning lines extending transversely of said phosphor and indexing strips; auxiliary deflection means for modulating the speed of tracing of said raster scanning lines; means responsive to indexing information produced by said indexing strips for deriving an indexing wave of a frequency nominally equal to the frequency at which successive phosphor strips capable of emitting light of a given color are traversed; a source of color information signals; means coupled to said color information signal source and to said indexing wave deriving means for modulating said indexing wave in accordance with said color information signals; means for applying an output of said indexing wave modulating means to said auxiliary deflection means; frequency doubling means; means for applying an output of said indexing wave modulating means to said frequency doubling means; and means for applying the output of said frequency doubling means to said beam intensity controlling means.

4. In combination with a source of luminance signals, a source of color difference signals and a color image reproducing device having electron gun means for producing a beam of electrons of controllable intensity, and a target for said beam of electrons, said beam target comprising an array of phosphor strips of different color emission characteristics arranged in a repeating sequence and including a plurality of indexing elements in association with said phosphor strips; apparatus comprising the combination of beam deflection means for causing said beam of electrons to trace a succession of substantially parallel scanning lines on said target transversely with respect to the phosphor strips of said array, the tracing of said scanning lines causing successive beam traversals of said indexing elements; means responsive to the beam traversals of said indexing elements for developing an indexing wave of a fundamental frequency nominally equal to the frequency at which successive phosphor strips of a given one of said different color emission characteristics are traversed by said beam; means coupled to said fundamental frequency indexing wave developing means and to said color difference signal source for modulating said indexing wave with said color difference signals; spot arresting means for varying the line scanning velocity of said beam; means coupled to said indexing wave modulating means for applying the modulated indexing wave to said spot arresting means; means coupled to said indexing wave modulating means for deriving from said modulated indexing wave a modulated carrier wave having a carrier frequency nominally equal to the second harmonic of said fundamental frequency; means coupled to said modulated second harmonic carrier wave deriving means for applying said modulated second harmonic carrier wave to said electron gun means; and means coupled to said luminance signal source for applying said luminance signals to said electron gun means.

5. In a system for displaying color images in response to correlated luminance and chrominance information comprising a color image reproducing device having means for generating a beam of electrons, electrode structure for controlling the intensity of said beam of electrons, and a target for said beam of electrons, said beam target comprising an array of phosphor strips of different color emission characteristics arranged in a repeating sequence and including a plurality of indexing elements in association with said phosphor strips, and beam deflection means for causing said beam of electrons to trace a succession of substantially parallel scanning lines on said target transversely with respect to the phosphor strips of said array, the tracing of said scanning lines causing successive beam traversals of said indexing elements; said system also including spot arresting means for varying the velocity at which said beam traces said scanning lines in accordance with a first carrier wave modulated by said chrominance information, and means coupled to said beam intensity controlling electrode structure for varying the intensity of said beam of electrons in accordance with a second carrier wave modulated by said chrominance information; apparatus comprising the combination of: means responsive to the beam traversals of said indexing elements for developing an indexing wave of a fundamental frequency nominally equal to the frequency at which successive phosphor strips of a given one of said different color emission characteristics are traversed by said beam; means coupled to said fundamental frequency indexing wave developing means for developing from an output thereof a second indexing wave of a frequency substantially equal to the second harmonic of said fundamental frequency; means including a coupling between said fundamental frequency indexing wave developing means and said spot arresting means for utilizing said fundamental frequency indexing wave as said first carrier wave; and means including a coupling between said second indexing wave developing means and said beam intensity varying means for utilizing said second harmonic indexing wave as said second carrier wave.

No references cited.

UNITED STATES PATENT OFFICE
CERTIFICATE OF CORRECTION

Patent No. 3,123,667 March 3, 1964

Loren B. Johnston

It is hereby certified that error appears in the above numbered patent requiring correction and that the said Letters Patent should read as corrected below.

Column 4, line 25, for "alse" read -- also --; column 6, line 34, for "approximately" read -- approximated --; line 51, strike out "a"; line 58, for "specific" read -- specified --; column 7, line 22, for "accomplished" read -- accompanied --; line 46, strike out "color group pitch, the UV-color phosphor mixing tech-"; column 8, line 11, for "response" read -- responsive --.

Signed and sealed this 6th day of July 1965.

(SEAL)
Attest:

ERNEST W. SWIDER
Attesting Officer

EDWARD J. BRENNER
Commissioner of Patents